(12) United States Patent
Aguilar

(10) Patent No.: US 9,551,145 B2
(45) Date of Patent: Jan. 24, 2017

(54) TARGETING ASSEMBLY

(71) Applicant: Antonio Aguilar, Modesto, CA (US)

(72) Inventor: Antonio Aguilar, Modesto, CA (US)

( * ) Notice: Subject to any disclaimer, the term of this patent is extended or adjusted under 35 U.S.C. 154(b) by 188 days.

(21) Appl. No.: 14/482,660

(22) Filed: Sep. 10, 2014

(65) Prior Publication Data

US 2016/0069680 A1 Mar. 10, 2016

(51) Int. Cl.
*G01C 15/00* (2006.01)
*E04B 2/00* (2006.01)
*F16L 5/00* (2006.01)

(52) U.S. Cl.
CPC .. *E04B 2/00* (2013.01); *F16L 5/00* (2013.01); *G01C 15/004* (2013.01)

(58) Field of Classification Search
CPC ........... G01C 15/00; G01C 15/10; G01C 9/34; G01C 9/28
USPC .............................. 33/290, DIG. 21
See application file for complete search history.

(56) References Cited

U.S. PATENT DOCUMENTS

| | | | |
|---|---|---|---|
| 3,815,250 A | 6/1974 | Roodvoets et al. | |
| 5,461,793 A | 10/1995 | Melville | |
| 5,568,265 A * | 10/1996 | Matthews | G01C 15/008 33/286 |
| D418,432 S | 1/2000 | Krantz | |
| 6,124,935 A * | 9/2000 | Matthews | G01B 11/27 33/286 |
| 6,371,626 B1 * | 4/2002 | Addona | G01C 15/002 33/520 |
| 6,532,676 B2 | 3/2003 | Cunningham | |
| 6,834,435 B2 | 12/2004 | Turner | |
| 6,986,209 B2 * | 1/2006 | Cook | G01C 15/008 33/286 |
| 7,155,834 B2 * | 1/2007 | Palumbo, III | G01C 15/002 33/227 |
| 7,493,699 B2 | 2/2009 | Kishi et al. | |
| 7,748,127 B1 * | 7/2010 | Cosimano | G01C 15/002 33/286 |
| 7,861,424 B2 | 1/2011 | Munroe et al. | |
| 2001/0034944 A1 * | 11/2001 | Cunningham | G01C 15/008 33/286 |
| 2002/0038513 A1 * | 4/2002 | Kallesen | G01C 15/008 33/286 |
| 2002/0062570 A1 * | 5/2002 | Palumbo, II | G01C 15/002 33/286 |
| 2004/0111902 A1 * | 6/2004 | Fletcher | G01C 15/10 33/286 |
| 2005/0060901 A1 * | 3/2005 | Cook | G01C 15/008 33/286 |
| 2006/0021237 A1 | 2/2006 | Marshall et al. | |
| 2009/0000135 A1 * | 1/2009 | Flowers, Jr. | G01C 9/20 33/286 |
| 2009/0033921 A1 * | 2/2009 | Loftis | F16L 1/10 33/286 |

(Continued)

*Primary Examiner* — Yaritza Guadalupe-McCall

(57) ABSTRACT

A targeting assembly includes a pipe that is installed in a construction environment. A housing is structured to be coupled to the pipe. A level is coupled to the housing so the level indicates an inclination of the pipe. A laser is coupled to the housing so the laser directs a laser beam toward a wall. The laser beam indicates a location that the pipe will penetrate the wall. An actuator is coupled to the housing. The actuator is electrically coupled to the laser so the actuator selectively actuates the laser.

13 Claims, 5 Drawing Sheets

(56) References Cited

U.S. PATENT DOCUMENTS

| | | | | |
|---|---|---|---|---|
| 2012/0117813 A1* | 5/2012 | Stevenson | ............ | G01C 15/002 33/286 |
| 2012/0297635 A1* | 11/2012 | Mickow | ............... | G01C 15/002 33/228 |
| 2014/0115907 A1* | 5/2014 | Gamon | ................ | G01C 15/004 33/286 |
| 2015/0160008 A1* | 6/2015 | Silberberg | ............... | G01C 9/28 33/381 |
| 2016/0069680 A1* | 3/2016 | Aguilar | .................... | B26F 1/00 33/290 |

* cited by examiner

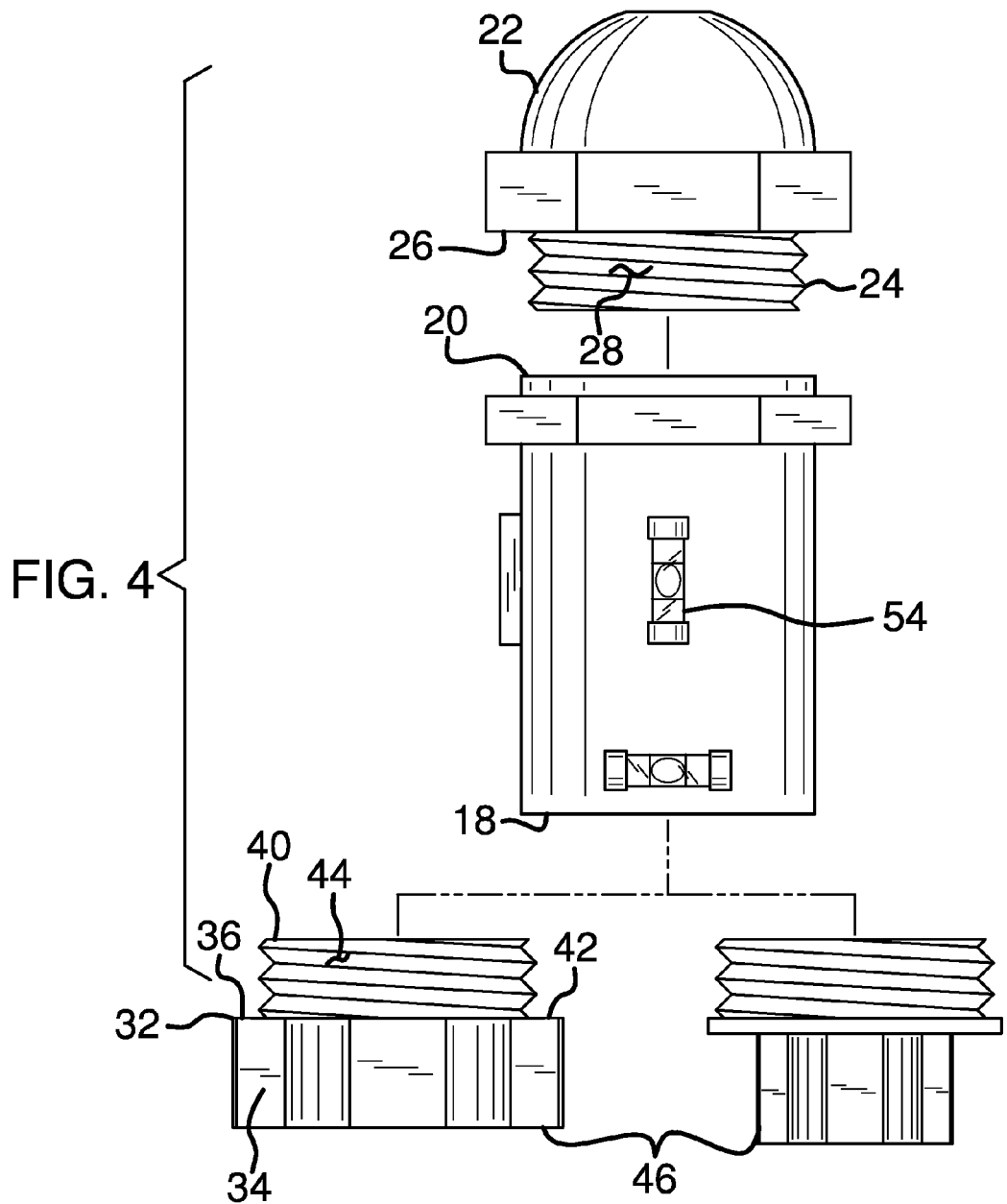

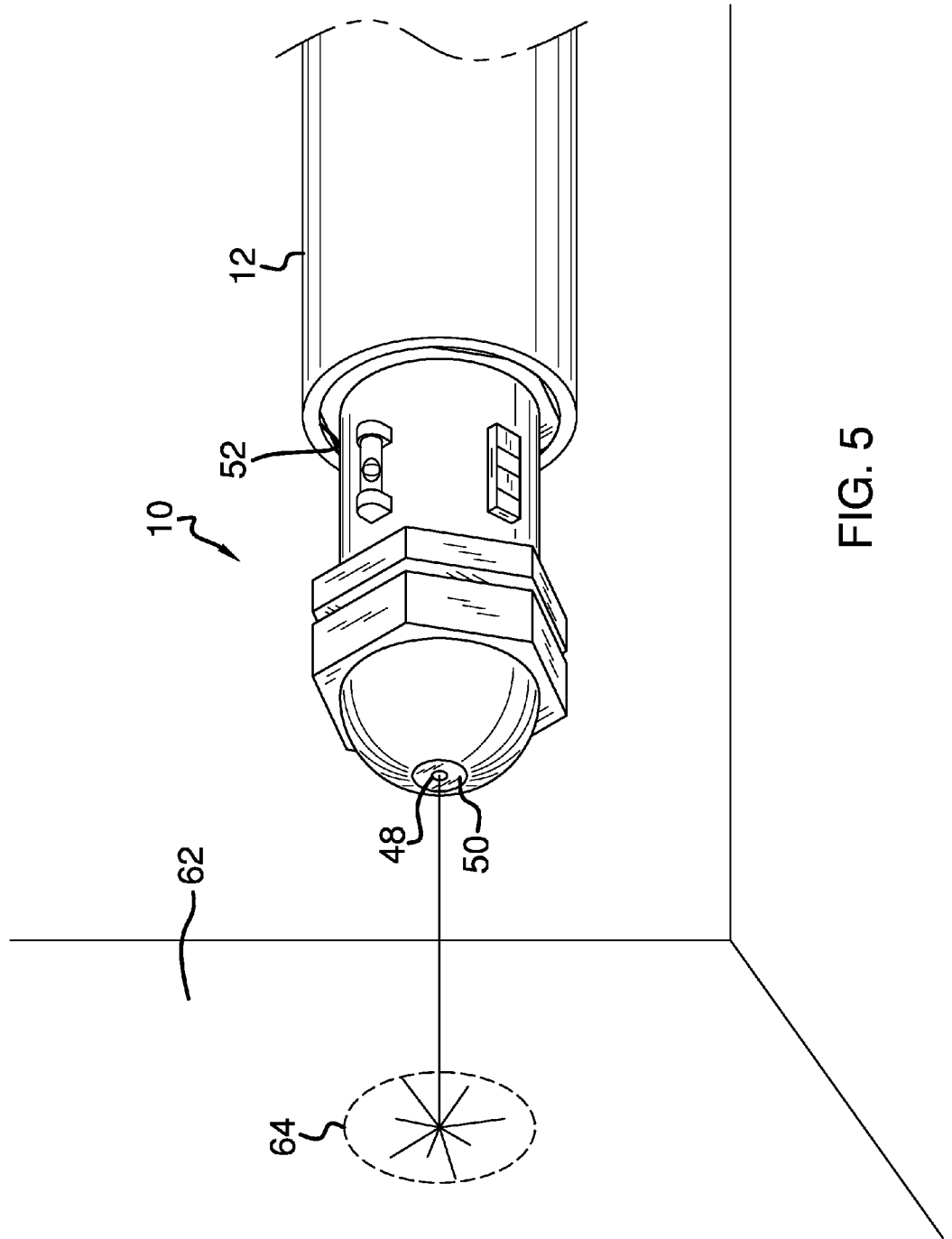

TARGETING ASSEMBLY

BACKGROUND OF THE DISCLOSURE

Field of the Disclosure

The disclosure relates to targeting devices and more particularly pertains to a new targeting device for indicating a location to cut a hole in a wall intended to receive a pipe.

SUMMARY OF THE DISCLOSURE

An embodiment of the disclosure meets the needs presented above by generally comprising a pipe that is installed in a construction environment. A housing is structured to be coupled to the pipe. A level is coupled to the housing so the level indicates an inclination of the pipe. A laser is coupled to the housing so the laser directs a laser beam toward a wall. The laser beam indicates a location that the pipe will penetrate the wall. An actuator is coupled to the housing. The actuator is electrically coupled to the laser so the actuator selectively actuates the laser.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a front exploded view of an embodiment of the disclosure.

FIG. 5 is an in-use view of an embodiment of the disclosure.

DESCRIPTION OF THE PREFERRED EMBODIMENT

Figure 1:
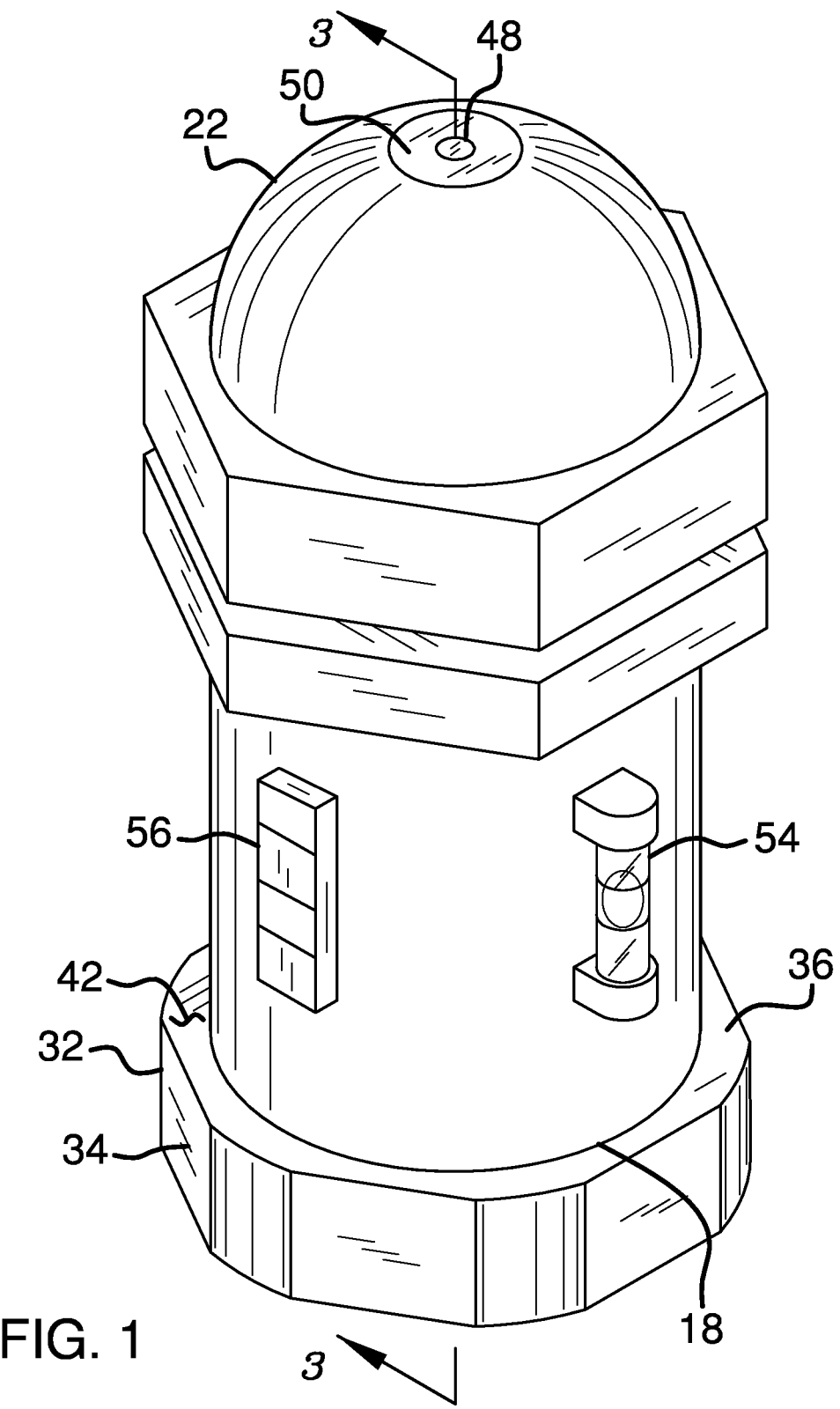
FIG. 1 is a perspective view of a targeting assembly according to an embodiment of the disclosure.
Figure 2:
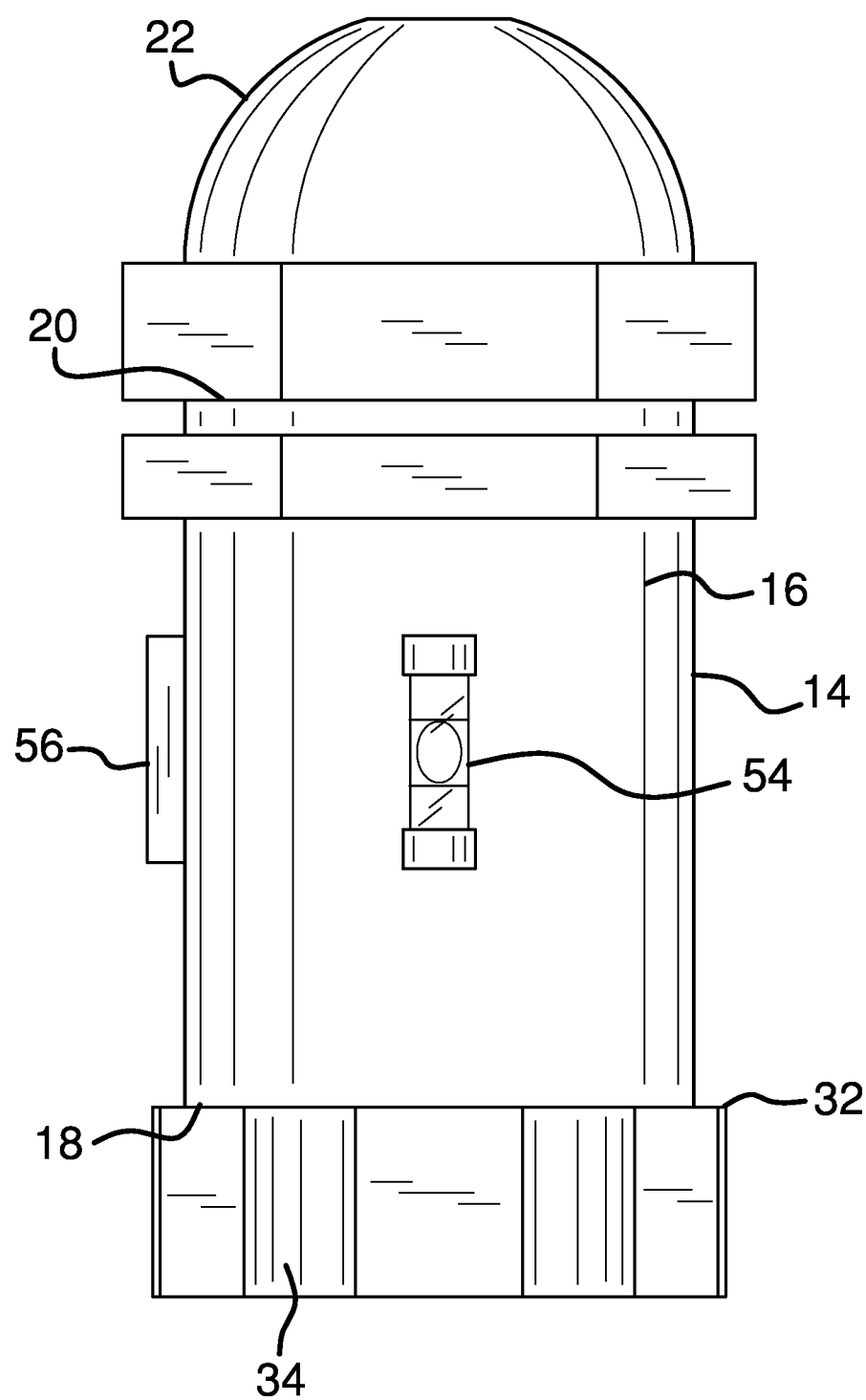
FIG. 2 is a front view of an embodiment of the disclosure.
Figure 3:
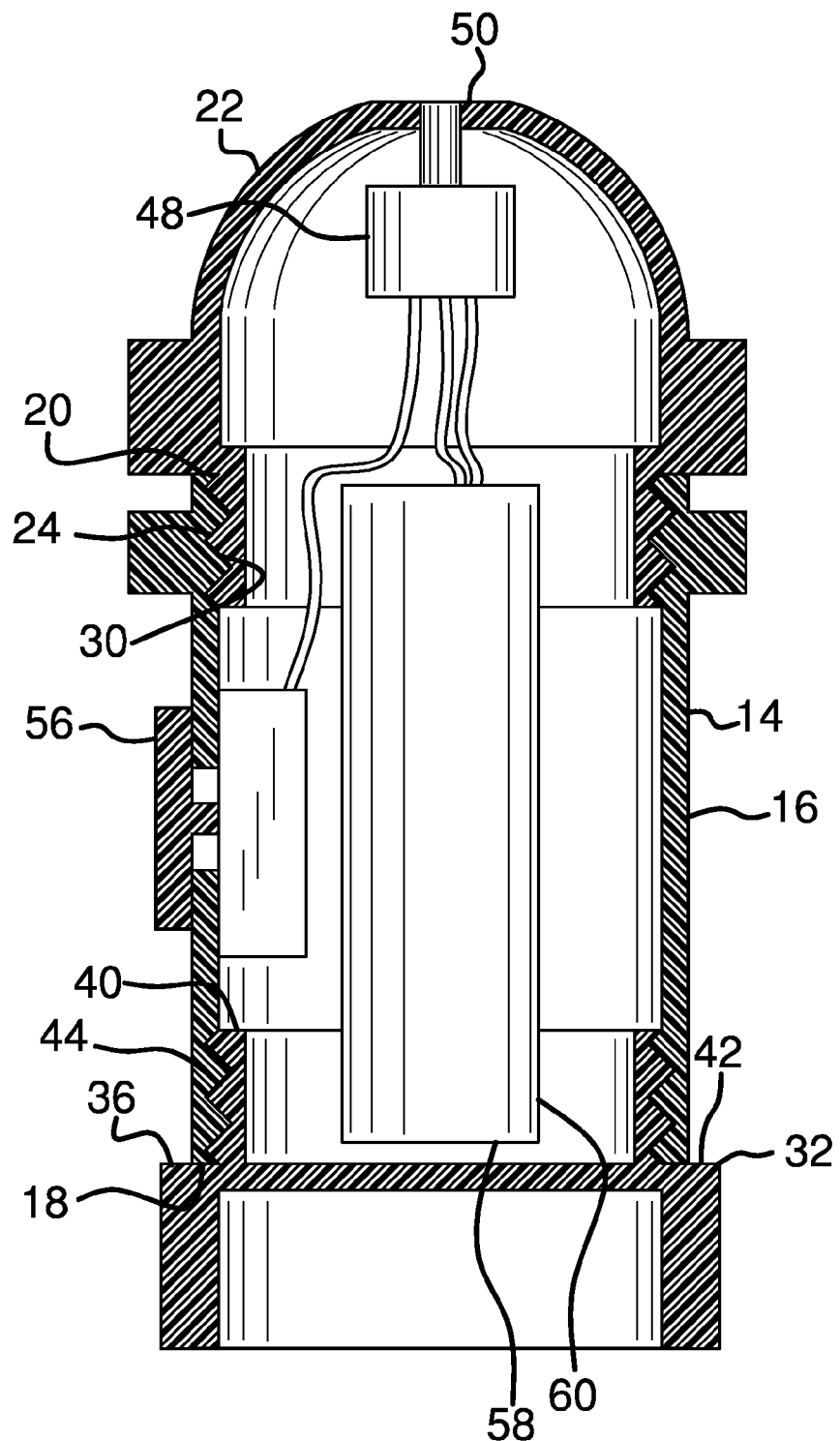
FIG. 3 is a cross sectional view taken along line 3-3 of FIG. 1 of an embodiment of the disclosure.

With reference now to the drawings, and in particular to FIGS. 1 through 5 thereof, a new targeting device embodying the principles and concepts of an embodiment of the disclosure and generally designated by the reference numeral 10 will be described.

As best illustrated in FIGS. 1 through 5, the targeting assembly 10 generally comprises a pipe 12 being installed in a construction environment. The pipe 12 may be a pipe of any conventional design. A housing 14 is provided. The housing 14 has an outer wall 16 extending between a first end 18 and a second end 20 of the housing 14. The first 18 and second 20 ends of the housing 14 are open. The outer wall 16 of the housing 14 may be curved so the housing 14 has a cylindrical shape.

A dome 22 is provided. A first coupler 24 is coupled to and extends away from a bottom side 26 of the dome 22. An outer surface 28 of the first coupler 24 is threaded. The outer surface 28 of the first coupler 24 threadably engages an inner surface 30 of the outer wall 16 of the housing 14. The bottom side 26 of the dome 22 abuts the second end 20 of the housing 14.

An adapter 32 is provided. The adapter 32 has an exterior wall 34 coupled to and extending away from an upper wall 36 of the adapter 32. The exterior wall 34 of the adapter 32 may have a plurality of interesting sides 38. The exterior wall 34 of the adapter 32 may form a regular polygon.

A second coupler 40 is coupled to and extends away from a top surface 42 of the upper wall 36 of the adapter 32. An outermost surface 44 of the second coupler 40 is threaded. The outermost surface 44 of the second coupler 40 threadably engages the inner surface 30 of the outer wall 16 of the housing 14. The top surface 42 of the upper wall 36 of the adapter 32 abuts the first end 18 of the housing 14.

The adapter 32 is one of a plurality of adapters 46. The exterior wall 34 of the adapters 46 each has a varying diameter. The pipe 12 may have one a plurality of diameters. A selected one of the adapters 46 are utilized to couple the housing 14 to the pipe 12 with a corresponding diameter with respect to the selected adapter 46.

A laser 48 is coupled to the dome 22. The laser 48 extends through an apex 50 of the dome 22. The laser 48 may be an infra-red laser of any conventional design. The selected adapter 46 is positioned within the pipe 12 so the exterior wall 34 of the selected adapter 46 abuts an interior surface 52 of the pipe 12. The laser 48 is positioned to emit a laser beam along a line that is aligned with the pipe 12.

A level 54 is coupled the outer wall 16 of the housing 14. The level 54 indicates an inclination of the pipe 12. The level 54 may be a fluid bubble level of any conventional design.

An actuator 56 is coupled to the outer wall 16 of the housing 14. The actuator 56 is electrically coupled to the laser 48. The actuator 56 selectively actuates the laser 48. A power supply 58 is coupled to the housing 14. The power supply 58 is electrically coupled to the actuator 56. The power supply 58 comprises at least one battery 60.

In use, the laser 48 directs the laser beam toward a wall 62. The laser beam indicates a location that the pipe 12 will penetrate the wall 62. A hole 64 is cut in the wall 62 that that pipe 12 will extend through. The assembly 10 assures that the hole 64 is properly positioned on the wall 62 to accept the pipe 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A targeting assembly comprising:
a pipe being installed in a construction environment;
a housing structured to be coupled to said pipe, said housing having an outer wall extending between a first end and a second end of said housing, said first and second ends of said housing being open;
a flange having a polygonal outer periphery extending from said housing proximate to said second end of said housing;
a level coupled to said housing such that said level indicates an inclination of said pipe;
a laser coupled to said housing such that said laser directs a laser beam toward a wall wherein said laser beam indicates a location that said pipe will penetrate the wall;
an actuator coupled to said housing, said actuator being electrically coupled to said laser such that said actuator selectively actuates said laser;
a dome having a first coupler coupled to and extending away from a bottom side of said dome, an outer surface of said first coupler being threaded wherein said dome is removably coupled to said second end of said housing; and
a second flange coupled to and extending from said dome, said second flange having a polygonal outer peripheral surface, said second flange being alignable with said first flange such that said polygonal outer periphery and said polygonal outer peripheral surface are configured for being engaged in common by a wrench.

2. The assembly according to claim 1, further comprising:
said housing having a second end; and
said outer surface of said first coupler threadably engaging an inner surface of said outer wall of said housing second such that said bottom side of said dome abuts said second end of said housing.

3. The assembly according to claim 1, further comprising said level being coupled to an outer surface of said outer wall of said housing.

4. The assembly according to claim 1, further comprising said laser being coupled to a dome such that said laser extends through an apex of said dome.

5. The assembly according to claim 1, further comprising an adapter having an exterior wall coupled to and extending away from an upper wall of said adapter.

6. The assembly according to claim 5, further comprising a second coupler coupled to and extending away from a top surface of said upper wall of said adapter.

7. The assembly according to claim 6, further comprising an outermost surface of said second coupler being threaded.

8. The assembly according to claim 7, further comprising said outermost surface of said second coupler threadably engaging an inner surface of said housing such that said top surface of said upper wall of said adapter abuts a first end of said housing.

9. The assembly according to claim 8, further comprising said adapter being positioned within said pipe such that said exterior wall of said adapter abuts an interior surface of said pipe wherein said laser is positioned to emit the laser beam along a line being aligned with said pipe.

10. The assembly according to claim 1, further comprising a power supply coupled to said housing.

11. The assembly according to claim 10, further comprising said power supply being electrically coupled to said actuator.

12. The assembly according to claim 11, further comprising said power supply comprising at least one battery.

13. A targeting assembly comprising:
a pipe being installed in a construction environment;
a housing, said housing having an outer wall extending between a first end and a second end of said housing, said first and second ends of said housing being open;
a flange having a polygonal outer periphery extending from said housing proximate to said second end of said housing;
a dome having a first coupler coupled to and extending away from a bottom side of said dome, an outer surface of said first coupler being threaded, said outer surface of said first coupler threadably engaging an inner surface of said outer wall of said housing such that bottom side of said dome abuts said second end of said housing;
a second flange coupled to and extending from said dome, said second flange having a polygonal outer peripheral surface, said second flange being alignable with said first flange such that said polygonal outer periphery and said polygonal outer peripheral surface are configured for being engaged in common by a wrench to rotate said housing with said dome;
an adapter, said adapter having an exterior wall coupled to and extending away from an upper wall of said adapter;
a second coupler coupled to and extending away from a top surface of said upper wall of said adapter, an outermost surface of said second coupler being threaded, said outermost surface of said second coupler threadably engaging said inner surface of said housing such that said top surface of said upper wall of said adapter abuts said first end of said housing;
a laser coupled to said dome such that said laser extends through an apex of said dome;
said adapter being positioned within said pipe such that said exterior wall of said adapter abuts an interior surface of said pipe wherein said laser is positioned to emit a laser beam along a line being aligned with said pipe, said laser directing the laser beam toward a wall wherein said laser beam indicates a location that said pipe will penetrate the wall;
a level coupled to an outer surface of said outer wall of said housing such that said level indicates an inclination of said pipe;
an actuator coupled to said housing, said actuator being electrically coupled to said laser such that said actuator selectively actuates said laser; and
a power supply coupled to said housing, said power supply being electrically coupled to said actuator, said power supply comprising at least one battery.

* * * * *